A. B. SIMONDS.
Screw Cutter.
No. 55,171.
Patented May 29, 1866.
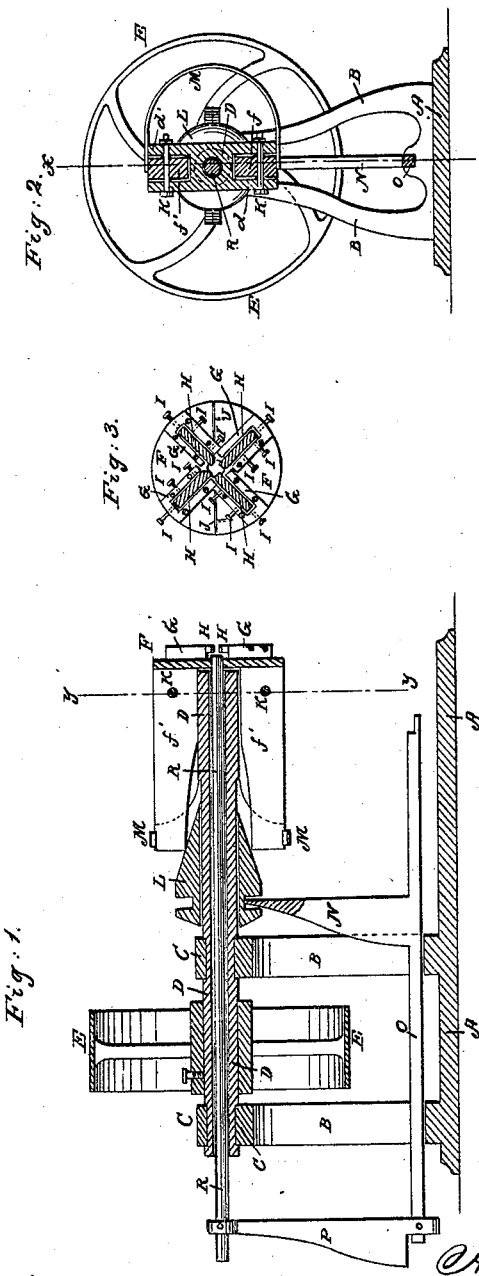

UNITED STATES PATENT OFFICE.

AMOS B. SIMONDS, OF YOUNGSTOWN, OHIO.

IMPROVED SCREW-CUTTING MACHINE.

Specification forming part of Letters Patent No. 55,171, dated May 29, 1866.

*To all whom it may concern:*

Be it known that I, AMOS B. SIMONDS, of Youngstown, Mahoning county, State of Ohio, have invented a new and useful Improvement in Screw-Cutting Machines; and I do hereby declare that the following is a full, clear, and exact description thereof, which will enable others skilled in the art to make and use the same, reference being had to accompanying drawings, forming part of this specification, in which—

Figure 1 is a vertical longitudinal section of my improved machine, taken through the line $x\,x$, Fig. 2. Fig. 2 is a vertical cross-section of the same, taken through the line $y\,y$, Fig. 1. Fig. 3 is a front-end view of the jaws that carry the dies.

Similar letters of reference indicate like parts.

My invention has for its object to furnish a screw-cutting machine by means of which screws may be cut accurately and of any required length without changing gages or stopping the machine; and it consists, first, in the combination and arrangement of the dies, movable jaws, and stops with each and with the head of the shaft; second, in the combination of a spring with the movable jaws for the purpose of raising the dies from the screw; and, third, in the combination of a sliding conical block, gage-rod, arms, and connecting-bar with each other, with the shaft, and with the movable jaws, as hereinafter more fully set forth.

A is the foundation or bed of the machine. B are the standards, upon the upper ends of which are formed the bearings C in which the shaft D revolves. E is the driving-pulley, which is attached to the shaft D in the ordinary manner, and by which motion is communicated to said shaft. Upon the end of the shaft D is formed a solid head, $d'$, the edges of which are slotted for the reception of the arms $f'$ of the jaws F, as shown in Fig. 2.

The jaws F are semicircular in form, and are firmly attached to the forward ends of the arms $f'$. Upon the faces of the jaws F are attached the die-holders G by screws or in any other substantial manner. Within these holders the dies H are adjustably held by the set-screws I, as shown in Fig. 3.

J are two stops attached to the edge of one of the jaws F and resting against the edge of the other when said jaws are in position for cutting the screw, and giving them firmness and stability during the operation.

The arms $f'$ of the jaws F are pivoted to the head $d'$ of the shaft D by bolts K, as shown in Fig. 2. The rear ends of the arms $f'$ rest upon the cone-shaped sliding block L, by the forward movement of which the jaws F are brought together, bringing the dies H into position for cutting the screw, and by the backward movement of which the jaws are allowed to separate, lifting the dies away from the screw.

M is a spring attached to the rear ends of the arms $f'$, as shown in Figs. 1 and 2, which, when the sliding block L is withdrawn from between the said arms $f'$, draws said rear ends together, opening or separating the jaws.

The cone-shaped sliding block L works loosely upon the shaft D, and has its rear part or end grooved, as shown in Fig. 1. In this groove rests the upper end of the arm N, the lower end of which is rigidly attached to the bar O. This bar O slides in grooves formed in the lower parts of the standards B, as shown in Figs. 1 and 2, and to its rear end is attached the lower end of the arm P by a set-screw, as shown. Through the upper end of the arm P passes the gage-rod R, which can be secured in any desired position by a set-screw, as shown in Fig. 1. The gage-rod R passes longitudinally through the center of the shaft D.

In setting the gage the block L, arms N and P, and bar O are all moved forward, closing the jaws F and bringing the dies H into the position for cutting the screw. The gage-rod R is then so adjusted that its forward end shall be at a distance from the dies H equal to the desired length of the screw. The machine is then started, and the screw fed into the machine, which, as soon as it reaches the end of the rod R, forces it back, and together with it the arms P and N, bar O, and block L. This lifts the dies away from the screw, as before described, and allows it to be withdrawn from the machine. The gage R and the parts connected with it are then again pushed forward, and the machine is ready for cutting another screw.

I claim as new and desire to secure by Letters Patent—

1. The combination and arrangement of the dies H, movable jaws F, and stops J, constructed and operated as described, with each other and with the head $d'$ of the shaft D, substantially as and for the purpose set forth.

2. The combination of the spring M with the arms $f'$ of the movable jaws F, substantially as described, and for the purpose set forth.

3. The combintion of the sliding conical block L, gage-rod R, arms P and N, and connecting-bar O with each other, with the shaft D, and with the movable jaws F, substantially as described, and for the purposes set forth.

AMOS B. SIMONDS.

Witnesses:
 WM. B. POLLOCK,
 W. A. BEECHER.